US007990255B2

(12) United States Patent
Santavicca et al.

(10) Patent No.: US 7,990,255 B2
(45) Date of Patent: Aug. 2, 2011

(54) RANGE EXTENDING POSITIVE REPEATER

(75) Inventors: Joseph Santavicca, Macomb, MI (US); Shane Wilson, Clinton Township, MI (US)

(73) Assignee: Audiovox Corporation, Hauppauge, NY (US)

( * ) Notice: Subject to any disclaimer, the term of this patent is extended or adjusted under 35 U.S.C. 154(b) by 1227 days.

(21) Appl. No.: 11/555,768

(22) Filed: Nov. 2, 2006

(65) Prior Publication Data

US 2008/0106391 A1 May 8, 2008

(51) Int. Cl.
*B60R 25/10* (2006.01)
(52) U.S. Cl. ............... 340/426.36; 340/12.22; 340/12.5; 340/12.51; 340/13.24; 455/7
(58) Field of Classification Search ............ 340/511, 340/539.21, 425.1, 426.36, 12.22, 12.5, 12.51, 340/13.24; 455/11.1
See application file for complete search history.

(56) References Cited

U.S. PATENT DOCUMENTS

| 4,539,706 | A | * | 9/1985 | Mears et al. ............... 455/11.1 |
| 4,673,921 | A | * | 6/1987 | Saito et al. ............... 340/539.32 |
| 5,241,689 | A | * | 8/1993 | Schwed et al. ............... 455/517 |
| 5,627,529 | A | * | 5/1997 | Duckworth et al. ....... 340/12.24 |
| 5,833,025 | A | * | 11/1998 | Bhandari ...................... 180/178 |
| 5,838,255 | A | * | 11/1998 | Di Croce ................... 340/12.22 |
| 6,101,428 | A | * | 8/2000 | Snyder ............................... 701/2 |
| 6,140,938 | A | * | 10/2000 | Flick .......................... 340/12.28 |
| 6,140,939 | A | * | 10/2000 | Flick .......................... 340/12.28 |
| 6,147,418 | A | * | 11/2000 | Wilson ......................... 307/10.6 |
| 6,493,537 | B1 | * | 12/2002 | Ogawa ............................... 455/9 |
| 6,664,889 | B2 | * | 12/2003 | Chang ....................... 340/426.17 |
| 7,139,527 | B2 | * | 11/2006 | Tamaki et al. ................... 455/16 |
| 7,542,827 | B2 | * | 6/2009 | Gerard et al. ...................... 701/2 |
| 2001/0011941 | A1 | * | 8/2001 | King et al. ..................... 340/5.64 |
| 2001/0031621 | A1 | * | 10/2001 | Schmutz ............................ 455/7 |
| 2002/0026855 | A1 | * | 3/2002 | Sakai et al. ....................... 75/247 |
| 2002/0028655 | A1 | * | 3/2002 | Rosener et al. .................. 455/16 |
| 2003/0162528 | A1 | * | 8/2003 | Juzswik ........................ 455/411 |
| 2004/0117073 | A1 | * | 6/2004 | Horst ................................ 701/2 |
| 2004/0146013 | A1 | * | 7/2004 | Song et al. .................... 370/279 |
| 2004/0185844 | A1 | * | 9/2004 | Neuman ....................... 455/420 |
| 2005/0053378 | A1 | * | 3/2005 | Stanchfield et al. .......... 398/115 |
| 2005/0060232 | A1 | * | 3/2005 | Maggio ............................ 705/14 |
| 2005/0130672 | A1 | * | 6/2005 | Dean et al. ................. 455/456.1 |
| 2006/0049922 | A1 | * | 3/2006 | Kolpasky et al. ......... 340/426.13 |
| 2006/0087405 | A1 | * | 4/2006 | Koike et al. .................. 340/5.64 |
| 2006/0220806 | A1 | * | 10/2006 | Nguyen .................... 340/426.36 |
| 2007/0076645 | A1 | * | 4/2007 | VanDrunen ................... 370/315 |

FOREIGN PATENT DOCUMENTS

| JP | 2000/295371 | * | 9/2000 |
| JP | 2000295371 | * | 4/2002 |
| JP | 2002112354 | * | 4/2002 |

* cited by examiner

*Primary Examiner* — Benjamin C Lee
*Assistant Examiner* — Quang Pham
(74) *Attorney, Agent, or Firm* — F. Chau & Associates, LLC

(57) ABSTRACT

A method for extending a reception range of a vehicle remote control system includes: receiving, at a repeater, a first radio frequency (RF) signal having inbound data packets indicating a vehicle function to be performed from a remote transmitter; generating, at the repeater, a second RF signal by placing outbound data packets indicating the vehicle function to be performed between the inbound data packets until reception of the first RF signal is complete; and transmitting, from the repeater, the second RF signal to a reception module of a vehicle remote control system.

20 Claims, 5 Drawing Sheets

Original Transmitted Message Frames

Repeated Transmitted Message Frames

RANGE EXTENDING POSITIVE REPEATER

BACKGROUND OF THE INVENTION

1. Technical Field

The present invention relates to vehicle remote control systems, and more particularly, to a repeater for extending a reception range of a vehicle remote control system.

2. Discussion of the Related Art

A vehicle remote control system is a system designed to remotely control certain functions and/or features of a vehicle. In one example, the system performs remote keyless entry by duplicating the features of a standard car key with the added convenience of operating power door locks, while eliminating the need to physically manipulate a key into a lock. In another example, the system performs remote start by remotely starting a car's engine by the push of a button on a handheld fob.

The vehicle remote control system generally includes two basic components, a portable radio transmitter disposed in a handheld fob and a receiver located inside a control module of a vehicle. The system works by sending pulses of radio frequency energy at a particular frequency from the transmitter to the receiver. These pulses are interpreted by the receiver, which, in turn, instructs the control module to perform an appropriate function.

Recently, automobile manufacturers have begun to add remote start features to their vehicles at the factory level. Prior to this, remote start systems were primarily sold and installed in the vehicle accessory aftermarket and at retail mobile electronics stores. One difference between the factory-installed and aftermarket remote start systems is reception range. For example, the aftermarket systems have a typical range that exceeds 800 feet, whereas the factory-installed systems have a range between 100 and 300 feet.

Accordingly, there is a need for improving the reception range a factory-installed remote control system.

SUMMARY OF THE INVENTION

In an exemplary embodiment of the present invention, a method for extending a reception range of a vehicle remote control system, comprises: receiving, at a repeater, a first radio frequency (RF) signal having inbound data packets indicating a vehicle function to be performed from a remote transmitter; generating, at the repeater, a second RF signal by placing outbound data packets indicating the vehicle function to be performed between the inbound data packets until reception of the first RF signal is complete; and transmitting, from the repeater, the second RF signal to a reception module of a vehicle remote control system.

The method further comprises performing, in a vehicle, the vehicle function indicated by the inbound or outbound data packets of the second RF signal. The vehicle function indicated by the inbound or outbound data packets is associated with remote keyless entry or remote start.

The method further comprises: reading, at the repeater, a strength of the first RF signal; determining, at the repeater, if the strength of the first RF signal is above or below a threshold; and not generating, at the repeater, the second RF signal if the first RF signal is above the threshold; or generating, at the repeater, the second RF signal if the first RF signal is below the threshold.

The method further comprises: down-converting, at the repeater, the first RF signal to a base-band signal; and filtering, at the repeater, the base-band signal prior to generating the second RF signal.

In an exemplary embodiment of the present invention, a method for learning a two-way transmitter/receiver initially incompatible with a vehicle remote control system, comprises: receiving, at a repeater, a first signal including a command indicating a vehicle function to be performed from the two-way transmitter/receiver; converting, at the repeater, the command to a second signal that is compatible with a wireless transmission scheme of the vehicle remote control system; transmitting, from the repeater, the second signal to the vehicle remote control system.

The method further comprises transmitting, from the repeater, a third signal indicating that the first signal was received by the repeater or the vehicle remote control system to the two-way transmitter/receiver. The method further comprises performing, by using the vehicle remote control system, the vehicle function indicated by the command of the first signal.

The first signal and third signal are RF, ZigBee, Near Field Communication (NFC), Bluetooth, ultra-wide band or infrared signals and the second signal is an RF signal.

In an exemplary embodiment of the present invention, a system for extending a reception range of a vehicle remote control system, comprises: a repeater for receiving a first RF signal having inbound data packets indicating a vehicle function to be performed from a remote transmitter, generating a second RF signal by placing outbound data packets indicating the vehicle function to be performed between the inbound data packets until reception of the first RF signal is complete; and transmitting the second RF signal; and a remote control module including a reception module for receiving the second RF signal, the remote control module for instructing the vehicle to perform the vehicle function indicated by the inbound or outbound data packets of the second RF signal.

The vehicle function indicated by the inbound or outbound data packets is associated with remote keyless entry or remote start. The repeater reads a strength of the first RF signal; determines if the strength of the first RF signal is above or below a threshold; and does not generate the second RF signal if the first RF signal is above the threshold; or generates the second RF signal if the first RF signal is below the threshold.

The repeater down-converts the first RF signal to a base-band signal; and filters the base-band signal prior to generating the second RF signal. The remote control module is a factory-installed remote control module. The factory-installed remote control module has a first reception range and the repeater has a second reception range that is greater than the first reception range.

When the remote transmitter is a two-way transmitter/receiver initially incompatible with the remote control module, the repeater receives a third signal including a command indicating a vehicle function to be performed from the two-way transmitter/receiver; converts the command to a fourth signal that is compatible with a wireless transmission scheme of the remote control module; and transmits the fourth signal to the remote control module.

The repeater transmits a fifth signal indicating that the third signal was received by the repeater or the remote control module to the two-way transmitter/receiver. The vehicle function indicated by the command of the third signal is performed by using the remote control module.

The third signal and fifth signal are RF, ZigBee, NFC, Bluetooth, ultra-wide band or infrared signals and the fourth signal is an RF signal. The remote control module is a factory-installed remote control module.

In an exemplary embodiment of the present invention, a method for extending a reception range of a vehicle remote control system, comprises: receiving, at a repeater, an RF signal having inbound data packets indicating a vehicle function to be performed from a remote transmitter; down-converting, at the repeater, the first RF signal to a base-band signal; filtering, at the repeater, the base-band signal; after filtering the base-band signal, generating, at the repeater, a second RF signal by placing outbound data packets indicating the vehicle function to be performed between the inbound data packets until reception of the first RF signal is complete; and transmitting, from the repeater, the second RF signal to a reception module of a vehicle remote control system.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
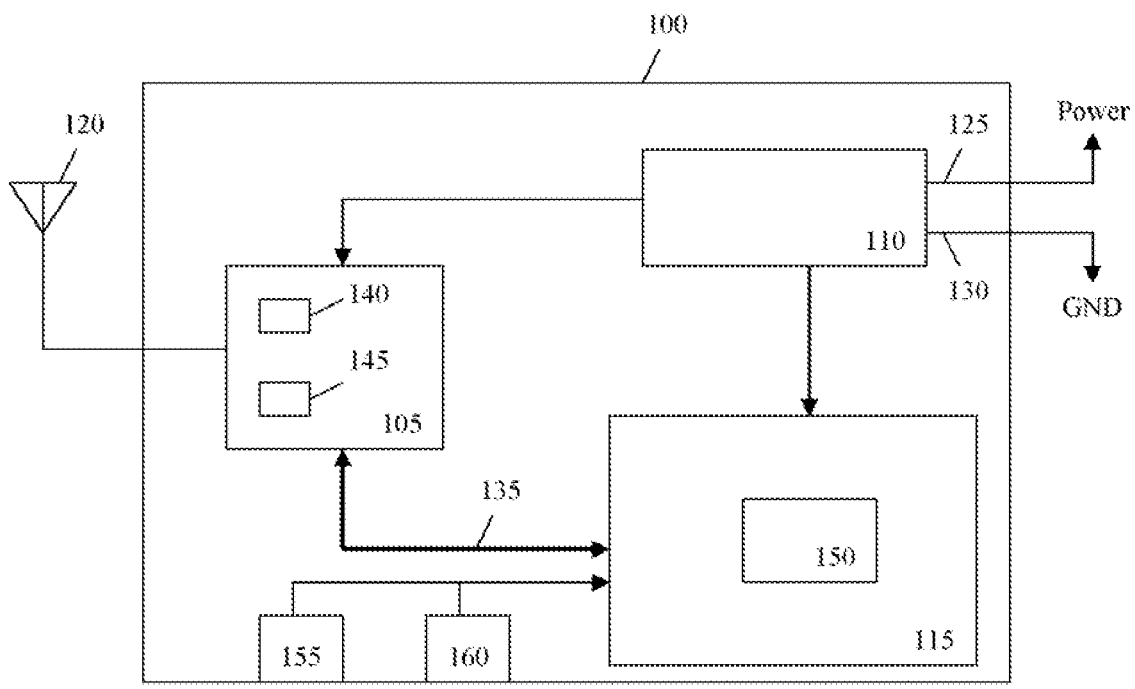
FIG. 1 is a block diagram of a range extending positive repeater according to an exemplary embodiment of the present invention.

FIG. 1 is a block diagram of a range extending positive repeater 100 according to an exemplary embodiment of the present invention. As shown in FIG. 1, the range extending positive repeater 100 includes a radio frequency (RF) transceiver 105 coupled to a central processing unit (CPU) 115 via a bus 135, and a power regulator 110.

The transceiver 105 includes a high sensitivity receiver 140 that is capable of receiving RF signals transmitted from distances of 1000 feet or more, a low power transmitter 145 for transmitting repeated RF signals and an antenna 120 for receiving and transmitting RF signals. The antenna 120 may be integrated with the transceiver 105 or it may be separate from the transceiver 105. Further, a separate antenna for receiving and a separate antenna for transmitting may be used instead of the single antenna 120.

The power regulator 110 includes connectors 125 and 130 for respectively connecting to a power supply such as a car battery and ground. The power regulator 110 converts, for example, 12V, provided from a car battery into a lower voltage and applies the lower voltage to the other components of the repeater 100. Instead of using the car battery as the power supply, the repeater 100 may be powered by a non-car rechargeable or disposable battery.

The CPU 115 may include a module 150 for performing various functions associated with preparing an inbound signal to be retransmitted or learned as will be discussed hereinafter with reference to FIGS. 2-5. Additional modules may be included in or connected to the CPU 115 for performing the functions associated with preparing an inbound signal to be retransmitted or learned. These modules may also be used to control a car or to provide two-way communication capability between a car and a remote control. They may also be used to add functions and/or features to a car such as time-of-day start, passive entry, car find, etc. Further, although shown inside the CPU 115, the module 150 can be located outside the CPU 115.

The repeater 100 further includes first and second inputs 155 and 160, which may be, for example, telematics or cell phone inputs or inputs that are capable of accepting data transmitted via other communication protocols such as Zig-Bee, Near Field Communication (NFC), Bluetooth, or infrared, it is to be understood that the repeater 100 may include more inputs than the two first and second inputs 155 and 160 shown in FIG. 1. It is to be further understood that the data received via these inputs 155 and 160 may also be sent over a vehicle bus or a subsidiary vehicle bus such as a local interconnect network (LIN) bus. Similar to the modules discussed above with regard to the CPU 115, the inputs 155 and 160 may be used by the repeater 100 for learning an aftermarket two-way transmitter/receiver as will be described hereinafter with reference to FIG. 5. Further, these inputs 155 and 160 either alone or in conjunction with the module 150 or additional modules, can be used to control a car or add two-way communication capability between a car and a remote control.

The components of the repeater 100 can be included in a plastic housing that is small enough to mount to the windshield or rear window of a vehicle without being visually unappealing or distracting to a driver. The repeater 100 can also be mounted on rear view or side mirrors of a vehicle, thereby enabling power supply wiring thereof to be advantageously used.

Figure 2:
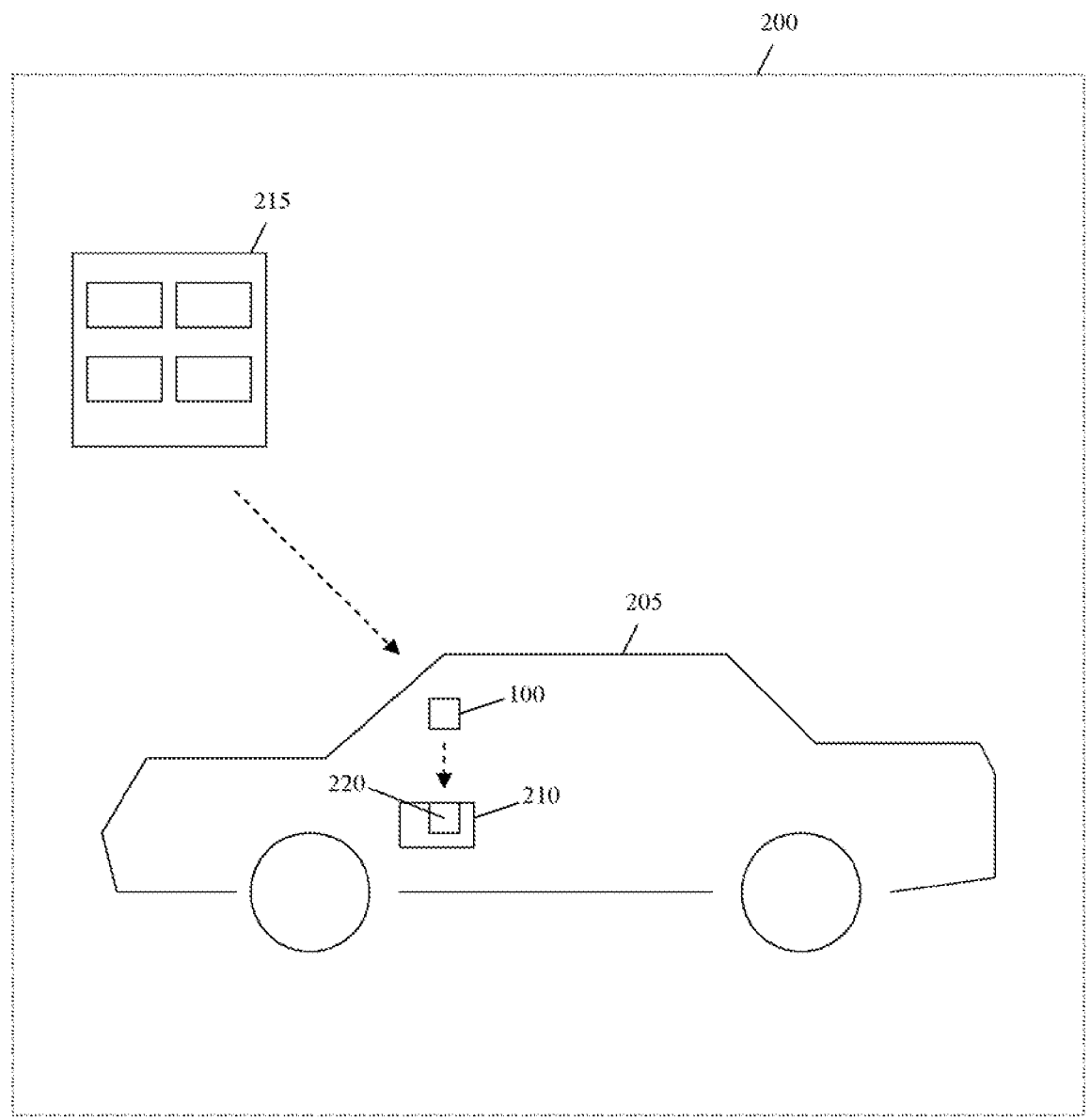
FIG. 2 is a diagram illustrating a remote control system including the range extending positive repeater of FIG. 1 according to an exemplary embodiment of the present invention.

FIG. 2 is a diagram illustrating a remote control system 200 including the range extending positive repeater 100 according to an exemplary embodiment of the present invention. As shown in FIG. 2, the repeater 100 is connected to a windshield of a vehicle 205. The vehicle 205 includes a remote control module 210. The module 210 includes a receiver 220 that is capable of receiving RF signals from the repeater 100 or a hand-held radio transmitter 215 when transmitted at close range. Although the module 210 can be part of any remote control system, it is preferable that the module 210 be part of a factory-installed remote start system having a reception range of about 100 to 300 feet; however, this invention is not limited thereto.

The operation of the system 200 will now be described in detail with reference to FIGS. 1-5.

Figure 3:
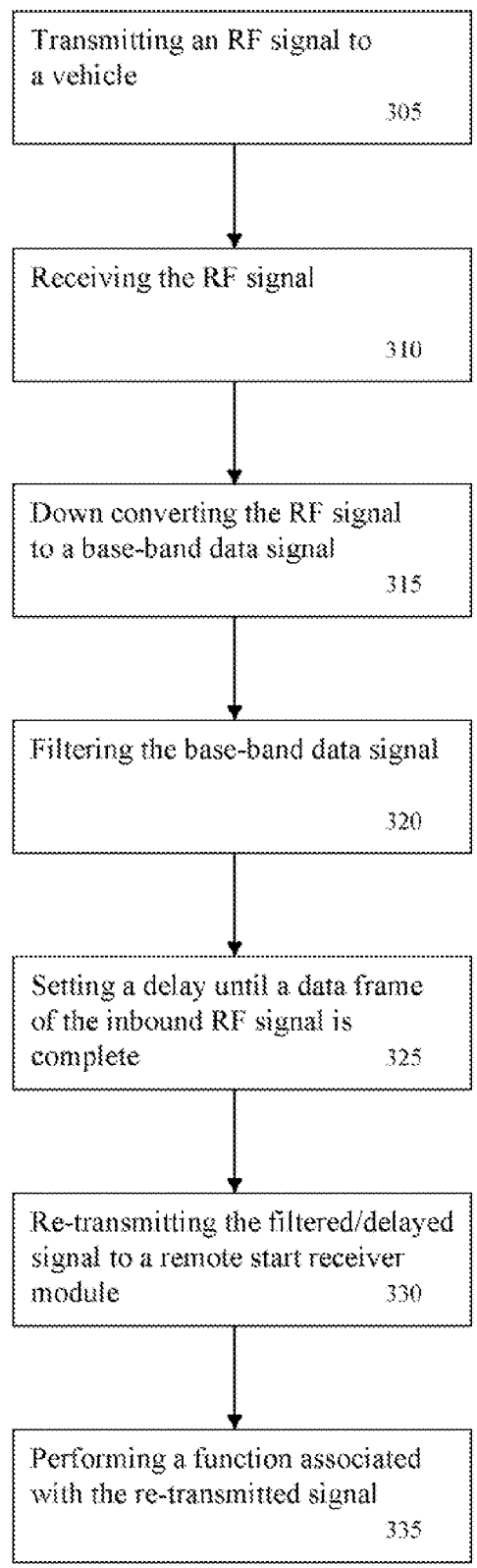
FIG. 3 is a flowchart illustrating the operation of the system shown in FIG. 2 according to an exemplary embodiment of the present invention.

As shown in FIG. 3, the radio transmitter 215 transmits an RF signal indicating a function to be performed by the vehicle 205 (305). The signal is received by the transceiver 105 (310), down-converted to a base-band data signal (315) and sent to the CPU 115 over the bus 135. The CPU 115 qualifies the signal, cleans it up (320), and then, establishes a delay until a data frame of the inbound RF signal is complete (325). The signal is sent back to the transceiver 105 via the bus 135, and then, re-transmitted to the factory module 210 at the same frequency as an original factory transmitter (330) and the desired function is performed (335).

Figure 4:
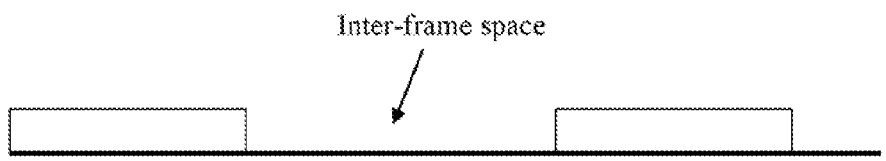
FIG. 4 is a diagram illustrating originally transmitted message frames and the original message frames re-transmitted according to an exemplary embodiment of the present invention.
Figure 4:
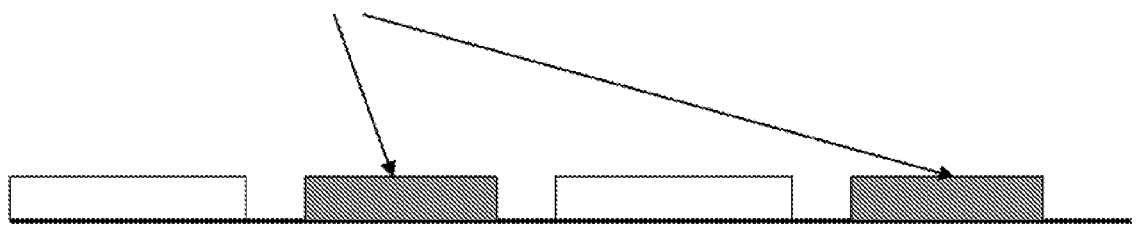

For proper operation of the system 200, the retransmission delay and retransmitted signal need to be determined. Assuming that the repeater 100 is capable of reading a sequence from a valid transmitter so that a basic frame pattern, data rate and frame repeat rate can be established, the CPU 115 sets up digital filters necessary for the correct data rate, duty cycle, and encoding method as well as establishes the retransmission delay. The retransmission occurs in an inter-frame space of originally transmitted message frames. For example, as shown in FIG. 4, the inter-frame space is located between an encrypted message that is retransmitted by a factory installed remote start system. Most of the transmissions from factory installed systems take 25-40% of the retransmission cycle, which is generally about 100 ms in duration. In the event there is insufficient inter-frame time for repeating the inbound signal between the original message frames, the repeater 100 can wait until the signal is complete, and then, retransmit. Although an operational delay may be noticed in this instance, the delay is likely to be of no great consequence.

Figure 5:
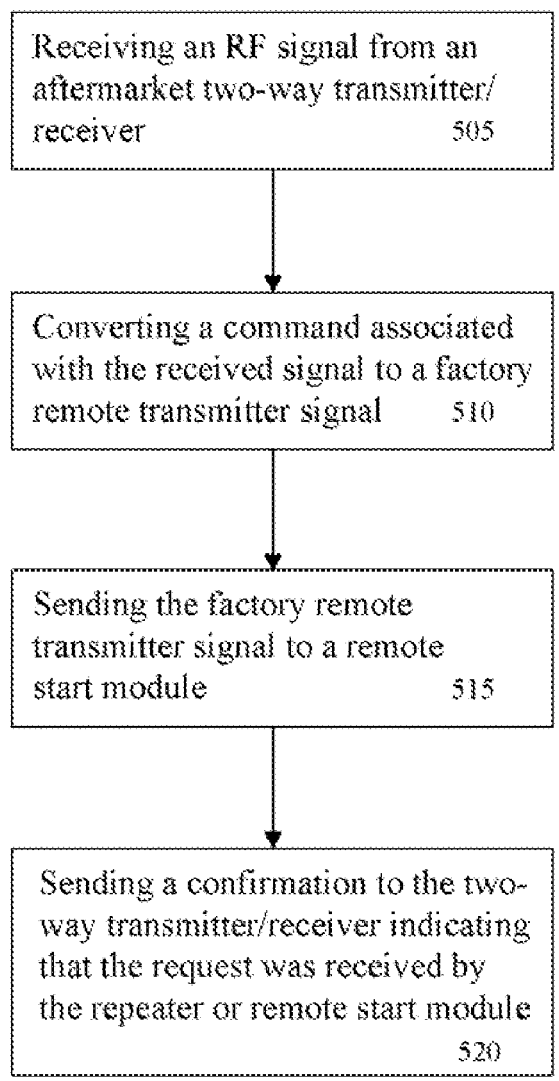
FIG. 5 is a flowchart illustrating a method for learning an aftermarket two-way transmitter/receiver according to an exemplary embodiment of the present invention.

The repeater 100 can also learn an aftermarket two-way transmitter/receiver, thereby allowing a consumer to upgrade a one-way factory transmitter to an aftermarket extended range transmitter with two-way communication capabilities. For example, as shown in FIG. 5, the repeater 100 receives a signal from an aftermarket two-way transmitter/receiver (not shown) (505), and then, converts a command associated with the received signal to a factory remote transmitter signal (510). The repeater 100 sends the factory remote transmitter signal to the remote start module 210 (515). The repeater 100 then sends a response transmission back to the two-way transmitter/receiver confirming that the transmission request was received by the repeater 100 and/or the remote start module 210 (520).

According to an exemplary embodiment of the present invention, a repeater is provided that extends the reception range of a remote control system. In particular, the repeater is used to extend the range of a factory provided remote transmitter for use with a factory-installed remote start system. The repeater also has the ability to learn an aftermarket two-way transmitter/receiver, thereby preventing the need to re-wire/install a complete aftermarket remote start system. Further, the repeater has the ability to be upgraded to provide additional functions and/or features to a factory-installed remote start system.

It is to be understood that the repeater 100 can be configured to read an inbound signal's average-signal-strength or receiver signal strength indication (RSSI) to determine if the inbound signal requires boosting. Thus, in the case where the inbound signal does not require boosting the repeater 100 will be bypassed, thereby preventing anti-scanning functions in the module 210 from rejecting the inbound signal due to retransmission or functions controlled by button push-hold actions from being disturbed by repeated transmissions.

It should also be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is to be further understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention.

It is therefore intended that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for extending a reception range of a vehicle remote control system, comprising:
   receiving, at a repeater, a first radio frequency (RF) signal having inbound data packets indicating a vehicle function to be performed from a remote transmitter;
   generating, at the repeater, a second RF signal by placing outbound data packets indicating the vehicle function to be performed between the inbound data packets until reception of the first RF signal is complete; and
   transmitting, from the repeater, the second RF signal to a reception module of a vehicle remote control system,
   wherein the repeater includes a first module that stores codes for defining a plurality of vehicle functions, the method further comprising:
   receiving, at the repeater, a request to provide the vehicle remote control system with a new function based on the codes stored in the first module; and
   transmitting, from the repeater, a function signal to the reception module of the vehicle remote control system, the function signal including the codes corresponding to the new function.

2. The method of claim 1, further comprising:
   performing, in a vehicle, the vehicle function indicated by the inbound or outbound data packets of the second RF signal.

3. The method of claim 1, wherein the vehicle function indicated by the inbound or outbound data packets is associated with remote keyless entry or remote start.

4. The method of claim 1, further comprising:
   reading, at the repeater, a strength of the first RF signal;
   determining, at the repeater, if the strength of the first RF signal is above or below a threshold; and
   not generating, at the repeater, the second RF signal if the first RF signal is above the threshold; or
   generating, at the repeater, the second RF signal if the first RF signal is below the threshold.

5. The method of claim 1, further comprising:
   down-converting, at the repeater, the first RF signal to a base-band signal; and
   filtering, at the repeater, the base-band signal prior to generating the second RF signal.

6. The method of claim 1 further comprising:
   receiving, at the repeater, a third signal including a command indicating a vehicle function to be performed from the remote transmitter;
   converting, at the repeater, the command to a fourth signal that is compatible with a wireless transmission scheme of the vehicle remote control system; and
   transmitting, from the repeater, the fourth signal to the vehicle remote control system.

7. The method of claim 6, further comprising:
transmitting, from the repeater, a fifth signal indicating that the third signal was received by the repeater or the vehicle remote control system to the remote transmitter.

8. The method of claim 6, further comprising:
performing, by using the vehicle remote control system, the vehicle function indicated by the command of the third signal.

9. The method of claim 7, wherein the third signal and fifth signal are RF, ZigBee, Near Field Communication (NFC), Bluetooth, ultra-wide band or infrared signals and the fourth signal is an RF signal.

10. A system for extending a reception range of a vehicle remote control system, comprising:
a repeater for receiving a first radio frequency (RF) signal having inbound data packets indicating a vehicle function to be performed from a remote transmitter; generating a second RF signal by placing outbound data packets indicating the vehicle function to be performed between the inbound data packets until reception of the first RF signal is complete; and transmitting the second RF signal; and
a remote control module including a reception module for receiving the second RF signal, the remote control module for instructing the vehicle to perform the vehicle function indicated by the inbound or outbound data packets of the second RF signal,
wherein the repeater includes a first module that stores codes for defining a plurality of vehicle functions and the remote control module is provided with new functionality based on the codes stored in the first module.

11. The system of claim 10, wherein the vehicle function indicated by the inbound or outbound data packets is associated with remote keyless entry or remote start.

12. The system of claim 10, wherein the repeater reads a strength of the first RF signal; determines if the strength of the first RF signal is above or below a threshold; and does not generate the second RF signal if the first RF signal is above the threshold; or generates the second RF signal if the first RF signal is below the threshold.

13. The system of claim 10, wherein the repeater down-converts the first RF signal to a base-band signal; and filters the base-band signal prior to generating the second RF signal.

14. The system of claim 10, wherein the remote control module is a factory-installed remote control module.

15. The system of claim 10, wherein the factory-installed remote control module has a first reception range and the repeater has a second reception range that is greater than the first reception range.

16. The system of claim 10, wherein when the remote transmitter is a two-way transmitter/receiver initially incompatible with the remote control module, the repeater receives a third signal including a command indicating a vehicle function to be performed from the two-way transmitter/receiver; converts the command to a fourth signal that is compatible with a wireless transmission scheme of the remote control module; and transmits the fourth signal to the remote control module.

17. The system of claim 16, wherein the repeater transmits a fifth signal indicating that the third signal was received by the repeater or the remote control module to the two-way transmitter/receiver.

18. The system of claim 16, wherein the vehicle function indicated by the command of the third signal is performed by using the remote control module.

19. The system of claim 17, wherein the third signal and fifth signal are radio frequency (RF), ZigBee, Near Field Communication (NFC), Bluetooth, ultra-wide band or infrared signals and the fourth signal is an RF signal.

20. The system of claim 16, wherein the remote control module is a factory-installed remote control module.

* * * * *